(12) United States Patent
Lin

(10) Patent No.: US 10,419,386 B2
(45) Date of Patent: Sep. 17, 2019

(54) ENDPOINT IDENTIFIERS REGISTRATION

(71) Applicant: HEWLETT PACKARD ENTERPRISE DEVELOPMENT LP, Houston, TX (US)

(72) Inventor: Changwang Lin, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 280 days.

(21) Appl. No.: 15/520,128

(22) PCT Filed: Oct. 21, 2015

(86) PCT No.: PCT/CN2015/092400
§ 371 (c)(1),
(2) Date: Apr. 19, 2017

(87) PCT Pub. No.: WO2016/062244
PCT Pub. Date: Apr. 28, 2016

(65) Prior Publication Data
US 2017/0324702 A1 Nov. 9, 2017

(30) Foreign Application Priority Data
Oct. 21, 2014 (CN) .......................... 2014 1 0559518

(51) Int. Cl.
*G06F 15/16* (2006.01)
*H04L 29/12* (2006.01)
*H04L 29/06* (2006.01)

(52) U.S. Cl.
CPC ........ *H04L 61/103* (2013.01); *H04L 61/2084* (2013.01); *H04L 63/08* (2013.01); *H04L 63/0272* (2013.01); *H04L 63/083* (2013.01)

(58) Field of Classification Search
CPC ... H04L 61/103; H04L 61/2084; H04L 63/08; H04L 63/0272; H04L 63/083
(Continued)

(56) References Cited

U.S. PATENT DOCUMENTS

2010/0316054 A1* 12/2010 Xu ...................... H04L 12/4633
370/392
2012/0144031 A1* 6/2012 Hu ........................... H04L 45/04
709/224
(Continued)

FOREIGN PATENT DOCUMENTS

CN 101656765 2/2010
CN 102447618 A 5/2012
(Continued)

OTHER PUBLICATIONS

International Preliminary Report on Patentability received for PCT Patent Application No. PCT/CN2015/092400, dated May 4, 2017, 5 pages.
(Continued)

*Primary Examiner* — Philip B Tran

(57) ABSTRACT

An Egress Tunnel Router (ETR) may establish a neighbor connection with a Map Server (MS). After the ETR establishes the neighbor connection with the MS, or after the ETR detects a status update of the MS from inaccessible to accessible, the ETR may register all Endpoint Identifiers EIDs configured on the ETR with the MS. After the ETR receives a register acknowledgement message with regard to a registered EID from the MS, the ETR may stop registering the registered EID with the MS.

15 Claims, 7 Drawing Sheets

101

An ETR establishes a neighbor connection with an MS. After the ETR establishes the neighbor connection with the MS, or after the ETR detects a status update of the MS from inaccessible to accessible, the ETR registers all EIDs configured on the ETR with the MS

102

After the ETR receives a register acknowledgement message with regard to a registered EID, the ETR stops registering the registered EID with the MS

(58) Field of Classification Search
USPC .................................................. 709/245, 224
See application file for complete search history.

(56) References Cited

U.S. PATENT DOCUMENTS

| | | | |
|---|---|---|---|
| 2013/0145152 A1* | 6/2013 | Maino | H04L 63/0428 |
| | | | 713/156 |
| 2014/0301387 A1 | 10/2014 | Subramanian et al. | |
| 2014/0341186 A1* | 11/2014 | Wu | H04W 36/0055 |
| | | | 370/331 |
| 2016/0065531 A1* | 3/2016 | Xiaopu | H04L 61/103 |
| | | | 709/238 |

FOREIGN PATENT DOCUMENTS

| | | |
|---|---|---|
| CN | 102957621 A | 3/2013 |
| CN | 104022956 A | 9/2014 |
| CN | 104052672 | 9/2014 |
| CN | 103841028 B | 2/2017 |
| JP | 2013-162166 A | 8/2013 |
| JP | 2013162466 | 8/2013 |

OTHER PUBLICATIONS

International Searching Authority, "Notification of Transmittal of the International Search Report and The Written Opinion", dated Jan. 21, 2016, PCT/CN2015/092400, 7 pages.

* cited by examiner

ENDPOINT IDENTIFIERS REGISTRATION

This application claims the benefit of priority from Chinese Patent Application, No. 201410559518.9, entitled "Method and device for restraining periodically registering Endpoint Identifiers (EID)s" and filed on Oct. 21, 2014, the entire content of which is hereby incorporated by reference.

BACKGROUND

Locator/Separator Identification Protocol (LISP) is a networking solution in which location and identity are separated to form two independent address spaces, i.e. Endpoint Identifier (EID) and Routing Locator (RLOC).

The EID is taken as a host address of a communication endpoint. In an LISP network, the function of the EID is similar to that of a Domain Name System (DNS). In the LISP network, the EID may migrate independently of the RLOC.

The RLOC is the address of an LISP router. The RLOC may be globally routed in the Internet and may be aggregated according to the network topology condition.

DETAILED DESCRIPTION

In an example of the present disclosure, in the Locator/Separator Identification Protocol (LISP) network, the Egress Tunnel Router (ETR) may register End Point Identifiers (EIDs) periodically with a Map Server (MS). A process of an ETR registering the EID and a process of an MS processing the registration of an EID may be described hereinafter.

The process of the ETR registering the EID with the MS may be as follows.

Generally, in the LISP network, a Transmission Control Protocol (TCP) connection is not established between an ETR and an MS. The ETR may encapsulate an LISP register message using User Datagram Protocol (UDP) and periodically send the LISP register message to the MS. The LISP register message may carry a to-be-registered EID.

The process of the MS processing the EID may be as follows.

A key, an address of each ETR and EIDs corresponding to each ETR, i.e. the EIDs, which may be authorized by the each ETR, may be pre-configured on the MS. After the MS receives the LISP register message, the MS may perform authentication and configuration check to enhance the security. The authentication performed by the MS may be key authentication. The configuration check performed by the MS may include checking the ETR, which may send out the LISP register message, and the to-be-registered EID in the LISP register message.

After the MS finishes the above authentication and configuration check, the MS may search a Map Database (Map DB) on the MS. If the Map DB does not store the to-be-registered EID in the LISP register message, the to-be-registered EID in the LISP register message may be stored in the Map DB and aging time of the to-be-registered EID may be set be to three minutes. If the MS does not receive the LISP register message again from the ETR, which may send out the LISP register message in three minutes, the MS may delete all EIDs registered by the ETR.

It may be seen from the above process of the ETR registering the EID that the ETR may interact with the MS using an UDP message. The UDP message may be unreliable. Therefore, the EID registration process may be unreliable. The ETR should periodically send the LISP register message to the MS to ensure that the MS may receive the LISP register message from the ETR. Therefore, the interaction between the ETR and the MS may be frequent and the MS may be always busy in processing the LISP register message.

With the methods provided by examples of the present disclosure, the ETR may not be required to periodically register the EIDs with the MS, which may reduce the interaction between the ETR and the MS and reduce the pressure of processing the EIDs. The methods provided by examples of the present disclosure may be described hereinafter.

Figure 1:
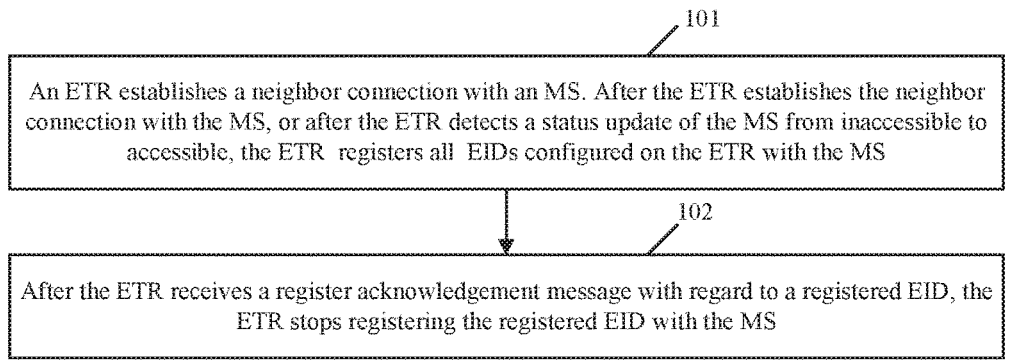
FIG. 1 is a flow chart illustrating an EID registration method in accordance with various examples of the present disclosure.

Referring to FIG. 1, FIG. 1 is a flow chart illustrating an EID registration method in accordance with various examples of the present disclosure. As shown in FIG. 1, the flow may include following blocks.

At block 101, an ETR may establish a neighbor connection with an MS. After the ETR establishes the neighbor connection with the MS, i.e. the establishment of the neighbor connection is finished, the ETR may register all EIDs configured on the ETR with the MS. Alternatively, after the ETR detects a status update of the MS from inaccessible to accessible, the ETR may register all the EIDs configured on the ETR with the MS. In an example of the present disclosure, an accessible status of the MS may refer to that the ETR may access the MS. An inaccessible status of the MS may refer to that the ETR cannot access the MS.

If the MS receives the EIDs from the ETR, the EIDs may be successfully registered with the MS. The MS may store the EIDs and may send a register acknowledgement message indicating that the EIDs may have been registered with the MS to the ETR.

At block 102, after the ETR receives the register acknowledgement message with regard to a registered EID, i.e. an EID, which has been registered with the MS, the ETR may stop registering the registered EID with the MS.

It may be seen from the flow shown in FIG. 1 that the ETR may not be required to repeatedly register the EIDs with the MS.

The flow shown in FIG. 1 may be described hereinafter with reference to two examples.

Figure 2:
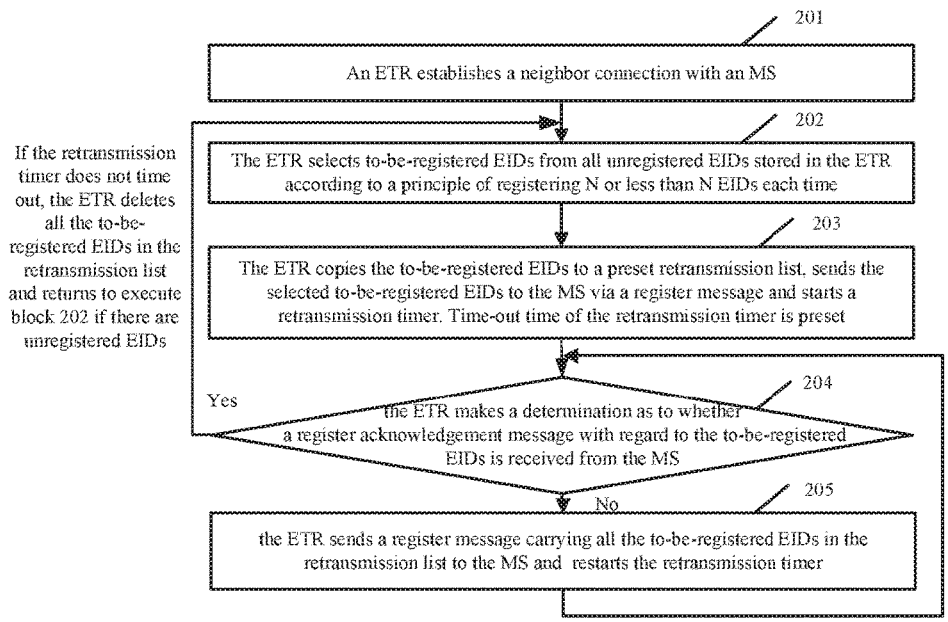
FIG. 2 is a flow chart illustrating another EID registration method in accordance with various examples of the present disclosure.

Referring to FIG. 2, FIG. 2 is a flow chart illustrating another EID registration method in accordance with various examples of the present disclosure. As shown in FIG. 2, the method may include following blocks.

At block 201, an ETR may establish a neighbor connection with an MS.

Figure 4:
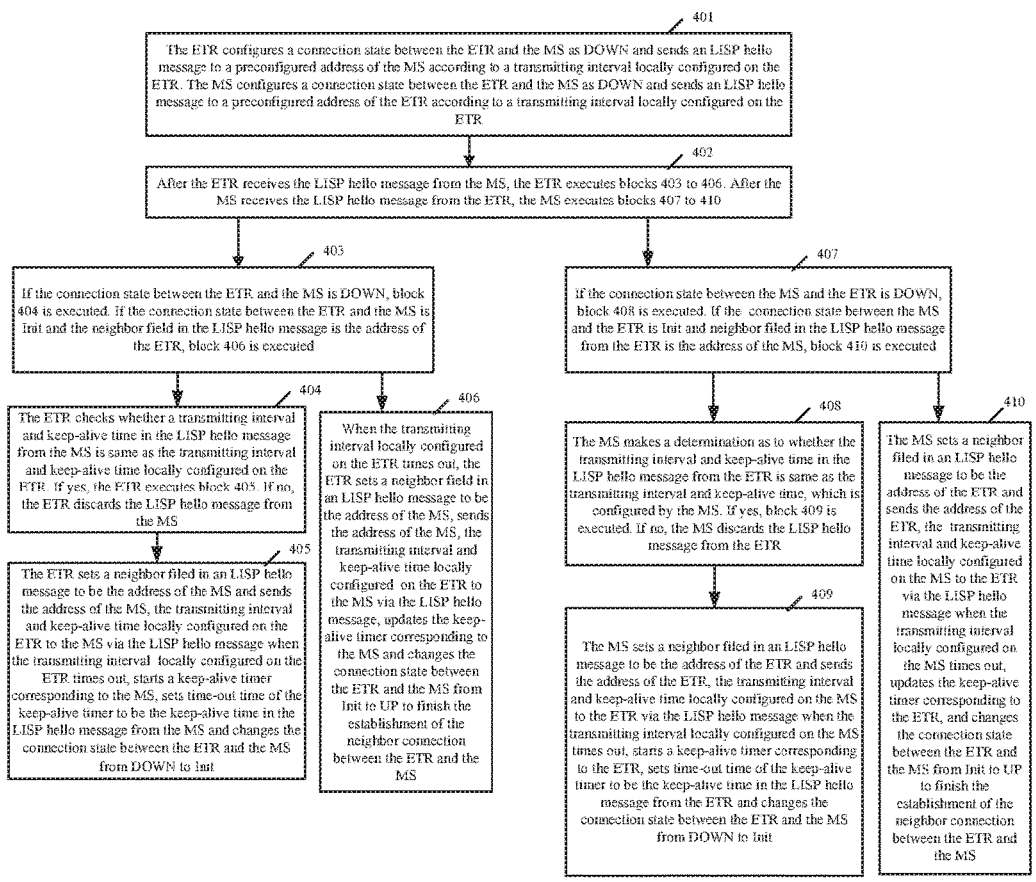
FIG. 4 is a flow chart illustrating neighbor establishment in accordance with various examples of the present disclosure.

In an example of the present disclosure, an address of the MS may be preconfigured on the ETR. At block 201, the ETR may establish the neighbor connection with the MS based on the address of the MS. FIG. 4 may illustrate a flow for establishing the neighbor connection between the ETR and the MS.

At block 202, the ETR may select to-be-registered EIDs from all unregistered EIDs configured on the ETR according to a principle of registering N or less than N EIDs each time.

In an example of the present disclosure, the ETR may not register all the EIDs configured on the ETR with the MS via one registration operation, but register all the EIDs configured on the ETR with the MS in batches and register a certain amount of EIDs with the MS each time. Taking the maximum number of the EIDs registered each time being less than N for example, N may be preconfigured according to the network circumstance. For instance, N may be set to be 10 or 20, etc.

At block 203, the ETR may copy the to-be-registered EIDs to a preset retransmission list, send the selected to-be-registered EIDs to the MS using a register message and start a retransmission timer. Time-out time of the retransmission timer may be preset.

In an example of the present disclosure, format of the register message may be similar to that of an LISP register message. In an example of the present disclosure, a nonce filed in the LISP register message may be used to carry serial number corresponding to the register message. Different register message may correspond to different serial number. Other fields in the register message may be similar to those in the LISP register message.

Figure 3:
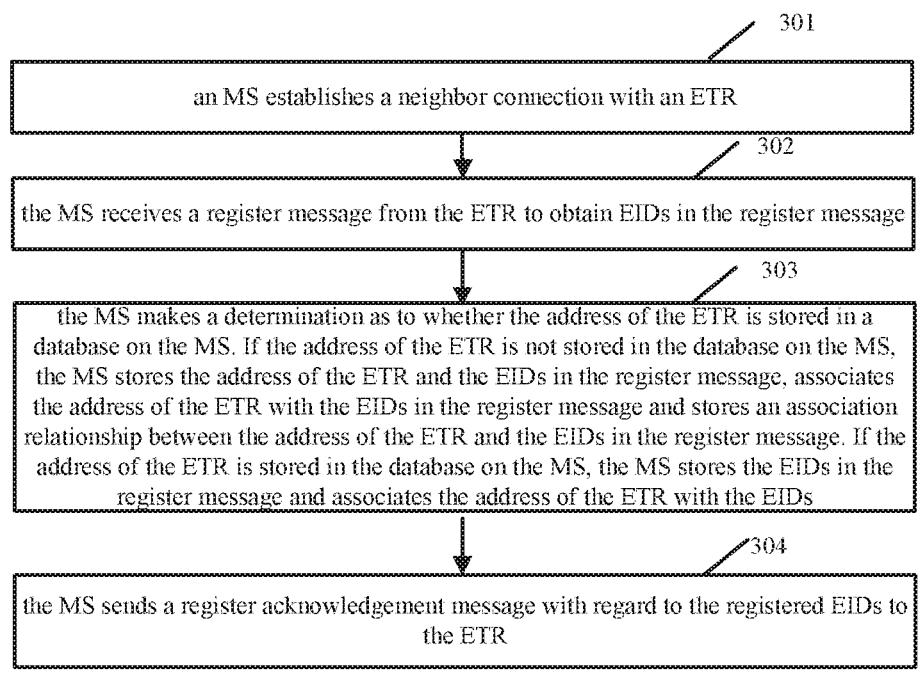
FIG. 3 is a flow chart illustrating another EID registration method in accordance with various examples of the present disclosure.

As shown in FIG. 3, when the MS receives the register message from the ETR, the MS may store the to-be-registered EIDs in the register message and send a register acknowledgement message to the ETR.

At block 204, the ETR may make a determination as to whether a register acknowledgement message with regard to the to-be-registered EIDs is received from the MS. If the register acknowledgement message with regard to the to-be-registered EIDs is received from the MS and the retransmission timer does not time out, the ETR may delete all the to-be-registered EIDs in the retransmission list and return to execute block 202 if there are unregistered EIDs and execute block 205 if the register acknowledgement message with regard to the to-be-registered EIDs is not received from the MS when the retransmission timer times out.

At block 205, the ETR may send a register message carrying all the to-be-registered EIDs in the retransmission list to the MS, restart the retransmission timer and execute block 204.

In the above example of the present disclosure, with the above blocks 202 to 205, the ETR may register all the EIDs configured on the ETR with the MS.

With the flow shown in FIG. 2, if the ETR receives the register acknowledgement message with regard to certain EIDs, the ETR would not repeatedly register the EIDs, with regard to which the register acknowledgement message may have been received.

It should be noted that in an example of the present disclosure, in a process for sending the register message, if the ETR finds that the neighbor connection between the ETR and the MS is abnormal, which means the neighbor connection between the ETR and the MS breaks, the ETR may delete all EIDs in the retransmission list and would not send the register message to the MS.

In another example of the present disclosure, the ETR may register all the EIDs configured on the ETR with the MS through following processing. The ETR may select to-be-registered EIDs front all unregistered EIDs configured on the ETR, copy the to-be-registered EIDs to a preset retransmission list, send a register message carrying the to-be-registered EIDs to the MS and make a determination as to whether the register acknowledgement message is received from the MS. If the register acknowledgement message is received from the MS, the ETR may delete all the to-be-registered EIDs in the retransmission list. If the register acknowledgement message is not received from the MS, the ETR may send a register message carrying the to-be-registered EIDs, with regard to which the register acknowledgement message is not received, to the MS, and return to perform making the determination as to whether the register acknowledgement message is received from the MS.

Referring to FIG. 3, FIG. 3 is a flow chart illustrating another EID registration method in accordance with various examples of the present disclosure. As shown in FIG. 3, the flow may include following blocks.

At block 301, an MS may establish a neighbor connection with an ETR.

The flow for establishing the neighbor connection between the MS and the ETR may be shown in FIG. 4.

At block 302, the MS may receive a register message from the ETR to obtain EIDs in the register message.

After the ETR determines that the establishment of the neighbor connection is finished, the ETR may send the register message to the MS.

At block 303, the MS may make a determination as to whether the address of the ETR is stored in a database on the MS. If the address of the ETR is not stored in the database on the MS, the MS may store the address of the ETR and the EIDs in the register message, associate the address of the ETR with the EIDs in the register message and store an association relationship between the address of the ETR and the EIDs in the register message. If the address of the ETR is stored in the database on the MS, the MS may store the EIDs in the register message and associate the address of the ETR with the EIDs.

Before block 303, the MS may perform authentication and configuration check.

After the MS record the EIDs registered by the ETR in the database on the MS, which means that the EIDs may have been registered with the MS, the MS may execute the block 304.

At block 304, the MS may send a register acknowledgement message with regard to the registered EIDs to the ETR.

In an example of the present disclosure, the register acknowledgement message may be a new message. The format of the register acknowledgement message may be similar to the LISP register message and following fields in the register acknowledgement message may be different from those in the LISP register message.

A type filed may be used to denote the register acknowledgement message. The value of the type field may be five.

A nonce filed may be used to carry serial number. The serial number in the nonce filed may be same as the serial number in the register message. Other fields of the register acknowledgement message may be similar to those in the LISP register message.

The process for establishing the neighbor connection between the ETR and the MS may be described hereinafter.

Referring to FIG. 4, FIG. 4 is a flow chart illustrating neighbor establishment in accordance with various examples of the present disclosure. As shown in FIG. 4, the flow may include following blocks.

At block 401, the ETR may configure a connection state between the ETR and the MS as DOWN and send a neighbor establishment message to a preconfigured address of the MS according to a transmitting interval configured on the ETR. The MS may configure a connection state between the ETR and the MS as DOWN and send a neighbor establishment message to a preconfigured address of the ETR according to a transmitting interval configured on the MS.

In an example of the present disclosure, the neighbor establishment message may be an LISP hello message. The LISP hello message sent from the ETR to the MS may carry the transmitting interval and keep-alive time configured on the ETR. The LISP hello message sent from the MS to the ETR may carry the transmitting interval and keep-alive time configured on the MS.

In an example of the present disclosure, the keep-alive time may refer to the keep-alive time of the neighbor connection between the ETR and the MS.

In an example of the present disclosure, the LISP hello message may include:
a type filed, used to carry a value, which may be used to indicate the type of the LISP hello message and may be seven;
a reserved field;
a message length filed, used to carry length of the LISP hello message;
a hello interval field, used to carry the transmitting interval of the LISP hello message;
a dead interval field, used to carry the keep-alive time;
a key ID field;
an authentication data length field; and
an authentication data field.

The key ID field, authentication data length field and the authentication data filed may be used to ensure the security of the LISP hello message and respectively carry a key, authentication data length and authentication data.

The LISP hello message may further include a neighbor field, used to carry a neighbor address. At block 401, based on the above format of the LISP hello message, the neighbor filed in the first LISP hello message sent by ETR or MS for the first time may be null.

At block 402, after the ETR receives the LISP hello message from the MS, the ETR may execute blocks 403 to 406. After the MS receives the LISP hello message from the ETR, the MS may execute blocks 407 to 410.

At block 403, if the connection state between the ETR and the MS is DOWN, block 404 may be executed. If the connection state between the ETR and the MS is Init and the neighbor field in the LISP hello message is the address of the ETR, block 406 may be executed.

In an example of the present disclosure, if the ETR does not receive the neighbor establishment message from the MS or the MS does not receive the neighbor establishment message from the ETR, the connection state between the ETR and the MS may be configured as DOWN. If the neighbor establishment message received by the ETR from the MS does not include the information of the MS, such as address of the MS or the neighbor establishment message received by the MS from the ETR does not include the information of the ETR, such as address of the ETR, the connection state between the ETR and the MS may be configured as Init. If the ETR receives the neighbor establishment message including the address of the MS from the MS and the MS receives the neighbor establishment message including the address of the ETR from the ETR, the connection state between the ETR and the MS may be configured as UP.

At block 404, the ETR may check whether a transmitting interval and keep-alive time in the LISP hello message from the MS is same as the transmitting interval and keep-alive time configured on the ETR. If the transmitting interval and keep-alive time in the LISP hello message from the MS is same as the transmitting interval and keep-alive time configured on the ETR, the ETR may execute block 405. If the transmitting interval and keep-alive time in the LISP hello message from the MS is different from the transmitting interval and keep-alive time configured on the ETR, the ETR may discard the LISP hello message from the MS.

At block 405, the ETR may set a neighbor filed in an LISP hello message to be the address of the MS and send the address of the MS, the transmitting interval and keep-alive time configured on the ETR to the MS using the LISP hello message when the transmitting interval configured on the ETR times out, start a keep-alive timer corresponding to the MS, set time-out time of the keep-alive timer to be the keep-alive time in the LISP hello message from the MS and change the connection state between the ETR and the MS from DOWN to Init.

At block 406, when the transmitting interval configured on the ETR times out, the ETR may set a neighbor field in an LISP hello message to be the address of the MS, send the address of the MS, the transmitting interval and keep-alive time configured on the ETR to the MS using the LISP hello message, update the keep-alive timer corresponding to the MS and change the connection state between the ETR and the MS from Init to UP to finish the establishment of the neighbor connection between the ETR and the MS.

At block 407, if the connection state between the MS and the ETR is DOWN, block 408 may be executed. If the connection state between the MS and the ETR is Init and neighbor tiled in the LISP hello message from the ETR is the address of the MS, block 410 may be executed.

At block 408, the MS may make a determination as to whether the transmitting interval and keep-alive time in the LISP hello message from the ETR is same as the transmitting interval and keep-alive time, which may be configured by the MS. If the transmitting interval and keep-alive time in the LISP hello message from the ETR is same as the transmitting interval and keep-alive time, which may be configured by the MS, block 409 may be executed. If the transmitting interval and keep-alive time in the LISP hello message from the ETR is different from the transmitting interval and keep-alive time, which may be configured by the MS, the MS may discard the LISP hello message from the ETR.

At block 409, the MS may set a neighbor tiled in an LISP hello message to be the address of the ETR and send the address of the ETR, the transmitting interval and keep-alive time configured on the MS to the ETR using the LISP hello message when the transmitting interval configured on the MS times out, start a keep-alive timer corresponding to the ETR, set time-out time of the keep-alive timer to be the keep-alive time in the LISP hello message from the ETR and change the connection state between the ETR and the MS from DOWN to Init.

At block 410, the MS may set a neighbor filed in an LISP hello message to be the address of the ETR and send the address of the ETR, the transmitting interval and keep-alive time configured on the MS to the ETR using the LISP hello message when the transmitting interval configured on the MS times out, update the keep-alive timer corresponding to the ETR, and change the connection state between the ETR and the MS from Init to UP to finish the establishment of the neighbor connection between the ETR and the MS.

Since the ETR and the MS may send the LISP hello message respectively according to the transmitting interval configured on the ETR and the transmitting interval configured on the MS, after the ETR changes the connection state between the ETR and the MS from the Init to the UP, if the ETR receives the LISP hello message, which is sent from the MS according to the transmitting interval configured on the MS before the keep-alive timer corresponding to the MS times out, the ETR may update the keep-alive timer corresponding to the MS. The LISP hello message from the MS may carry the address of the ETR, the transmitting interval and keep-alive time configured on the MS. If the ETR finds that the keep-alive timer corresponding to the MS times out, the ETR may change the connection state between the ETR and the MS from UP to DOWN and reestablish the neighbor connection with the MS.

After the MS changes the connection state between the ETR and the MS from Init to UP, if the MS receives the LISP hello message, which is sent from the ETR according to the transmitting interval configured on the ETR before the keep-alive timer corresponding to the ETR times out, the MS may update the keep-alive timer corresponding to the ETR. The LISP hello message from the ETR may carry the address of the MS, the transmitting interval and keep-alive time configured on the ETR. If the MS finds that the keep-alive timer corresponding to the ETR times out, the MS may change the connection state between the ETR and the MS from UP to DOWN, start an aging timer, aging time of which may be preset and delete all EIDs registered by the ETR with the MS when the aging timer times out.

In another example of the present disclosure, when the ETR establishes the neighbor connection with the MS, the ETR may transmit a neighbor establishment message to the MS. If the connection state between the ETR and the MS is DOWN and transmitting interval and keep-alive time in a neighbor establishment message received from the MS is same as transmitting interval and keep-alive time locally configured on the ETR, the ETR may change the connection state between the ETR and the MS to Init. If the connection state between the ETR and the MS is Init and a neighbor filed in a neighbor establishment message received from the MS is an address of the ETR, the ETR may change the connection state between the ETR and the MS to UP.

In another example of the present disclosure, when the MS establishes the neighbor connection with the ETR, the MS may transmit a neighbor establishment message to the ETR. If the connection state between the ETR and the MS is DOWN and transmitting interval and keep-alive time in a neighbor establishment message received from the ETR is same as transmitting interval and keep-alive time locally configured on the MS, the MS may change the connection state between the ETR and the MS to Init. If the connection state between the ETR and the MS is Init and a neighbor filed in the neighbor establishment message received from the ETR is an address of the MS, the MS may change the connection state between the ETR and the MS to UP.

Figure 5:
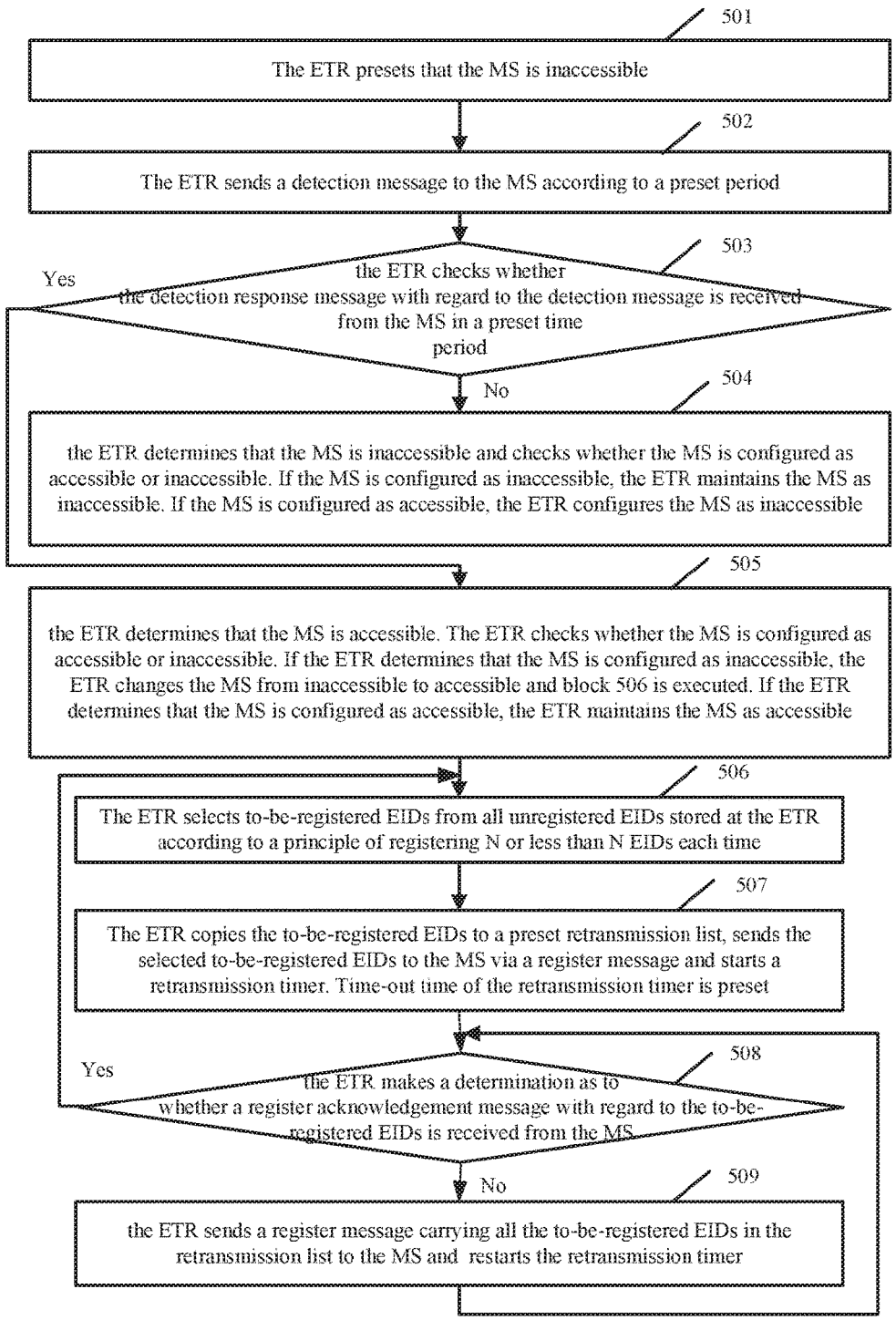
FIG. 5 is a flow chart illustrating another EID registration method in accordance with various examples of the present disclosure.

When the neighbor connection is not required to be established between the ETR and the MS, the flow may be shown in FIG. 5.

Referring to FIG. 5, FIG. 5 is a flow chart illustrating another EID registration method in accordance with various examples of the present disclosure. As shown in FIG. 5, the method may include following blocks.

At block 501, the ETR may preset a state value indicating whether the MS is accessible or not. In an example of the present disclosure, the ETR may preset an initial sate value as inaccessible.

At block 502, the ETR may send a detection message to the MS according to a preset period.

When the MS receives the detection message from the ETR, the MS may send a detection response message to the ETR.

At block 503, the ETR may check whether the detection response message with regard to the detection message is received from the MS in a preset time period after the ETR sends the detection message to the MS. If the ETR does not receive the detection response message in the preset time period, block 504 may be executed. If the ETR receives the detection response message in the preset time period, block 505 may be executed.

At block 504, the ETR may determine that the MS may be inaccessible and check whether the MS is configured as accessible or inaccessible. If the MS is configured as inaccessible, the ETR may maintain the MS as inaccessible. If the MS is configured as accessible, the ETR may configure the MS as inaccessible.

At block 505, the ETR may determine that the MS may be accessible. The ETR may check whether the MS is configured as accessible or inaccessible. If the ETR determines that the MS is configured as inaccessible, the ETR may change the MS from inaccessible to accessible and block 506 may be executed. If the ETR determines that the MS is configured as accessible, the ETR may maintain the MS as accessible.

The above blocks 501 to 505 may describe the process of the ETR performing accessible detection for the MS.

Blocks 506 to 509 may be similar to the above blocks 202 to 205.

The flow shown in FIG. 5 may ensure that after the ETR receives the register acknowledgement message with regard to the registered EID from, the ETR would not repeatedly register the EID.

Figure 6:
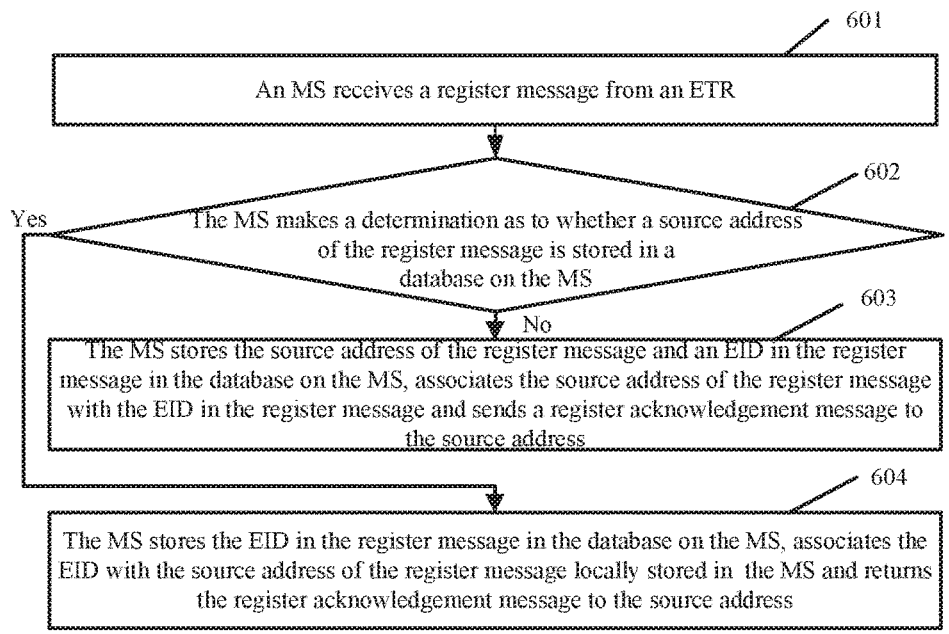
FIG. 6 is a flow chart illustrating another HD registration method in accordance with various examples of the present disclosure.

Referring to FIG. 6, FIG. 6 is a flow chart illustrating another EID registration method in accordance with various examples of the present disclosure. As shown in FIG. 6, the flow may include following blocks.

At block 601, an MS may receive a register message from an ETR.

At block 602, the MS may make a determination as to whether a source address of the register message is stored in a database on the MS. If the source address of the register message is not stored in the database on the MS, block 603 may be executed. If the source address of the register message is stored in the database on the MS, block 604 may be executed.

At block 603, the MS may store the source address of the register message and an EID in the register message in the database on the MS, associate the source address of the register message with the EID in the register message and send a register acknowledgement message to the source address.

At block 604, the MS may store the EID in the register message in the database on the MS, associate the EID with the source address of the register message stored in the MS and return the register acknowledgement message to the source address.

It should be noted that in examples of the present disclosure, when the MS receives the register message used to register the EID from the ETR, the MS may perform accessible detection for the ETR, i.e. periodically send the detection message to the address of the ETR. When the ETR receives the detection message from the MS, the ETR may send the detection response message to the MS. The MS may check whether the MS receives the detection response message with regard to the detection message from the ETR in a time period after the MS sends the detection message to the ETR. If the detection response message with regard to the detection message is received from the ETR after the time period after the MS sends the detection message to the ETR, the MS may determine that the ETR may not be accessible, start an aging timer, time-out time of which may be preset, and delete all EIDs registered by the ETR with the MS when the aging timer times out.

In an example of the present disclosure, the detection message may be an Internet Control Message Protocol (ICMP) message. The detection response message may be an ICMP response message.

It should be noted that in the above examples, the EIDs on the ETR may not be fixed, but may be changed. For instance, new EIDs may be added or EIDs may be deleted. If the EIDs on the ETR are changed, the ETR may notify the MS of the change.

When a new EID is added to the ETR, if the neighbor connection between the ETR and the MS is normal or the MS is accessible, the following process 1 may be executed.

The ETR may register the newly added EID with the MS and stop registering the newly added EID with the MS after receives the register acknowledgement message from the MS.

The ETR may add the newly added EID to an update list and start a corresponding update timer.

When the update tinier times out, the ETR may copy EIDs in the update list to a preset retransmission list, send the EIDs in the update list to the MS using the register message and start a retransmission timer. The time-out time of the retransmission tinier may be preset. When the MS receives the newly added EID from the ETR, the MS may store the EID in the database on the MS, associate the EID with the address of the ETR stored in the database on the MS and return the register acknowledgement message to the ETR.

The ETR may make a determination as to whether the register acknowledgement message with regard to the EID in the register message is received from the MS. If the ETR receives the register acknowledgement message and the retransmission timer does not time out, the ETR may clear all the EIDs in the retransmission list. If the ETR does not receive the register acknowledgement message, the ETR may re-execute the operation of sending all the EIDs in the retransmission list to the MS using the register message and starting the retransmission timer.

When the ETR intends to delete an EID, if the neighbor connection between the ETR and the MS is normal or the MS is accessible, the ETR may execute following process 2.

The ETR may determine a to-be-deleted EID and notify the MS of the to-be-deleted EID, so that the MS may delete the to-be-deleted EID from all EIDs registered by the ETR with the MS. After the ETR receives the delete acknowledgement message indicating that the to-be-deleted EID may have been deleted by the MS from the MS, the ETR may delete the to-be-deleted EID from the database on the ETR. The ETR may add the to-be-deleted EID to the update list and start the corresponding update timer.

When the update timer times out, the EID may copy the to-be-deleted EID in the update list to the preset retransmission list, send the to-be-deleted EID in the update list to the MS using the register message and start the retransmission timer. The time-out time of the retransmission timer may be preset.

When the MS receives the to-be-deleted EID from the ETR, the MS may find the to-be-deleted EID from all the EIDs associated with the ETR, deleted the EID and send the delete acknowledgement message to the ETR. The format of the delete acknowledgement message may be similar to that of the above register acknowledgement message.

After the ETR receives the delete acknowledgement message from the MS and the retransmission timer does not time out, the ETR may delete the EID, which may have been deleted by the MS from the retransmission list. If the ETR does not receive the delete acknowledgement message from the MS when the retransmission timer times out, the ETR may re-execute sending the to-be-deleted EID in the retransmission list to the MS using the register message and start the retransmission timer.

In examples of the present disclosure, when the EIDs configured on the ETR are changed, such as added or deleted, the ETR may notify the MS of the changed EID, but may not notify the MS of the unchanged EIDs.

In examples of the present disclosure, if the MS uses EIDs configured on the ETR and the MS does not store the EIDs, the MS may send a request message to the ETR to request for all of or partial of the EIDs configured on the ETR. After the ETR receives the request message, the ETR may send the EIDs to the MS using the register message. After the MS receives the register message from the ETR, the MS make a determination as to whether the source address of the register message is stored in a database on the MS. If the source address of the register message is not stored in the database on the MS, the MS may associate the source address of the register message with the EIDs in the register message, store the source address of the register message and the EIDs in the register message and return the register acknowledgement message to the source address. If the source address of the register message is stored in the database on the MS, the MS may store the EIDs in the register message in the database on the MS, associate the source address with the EIDs in the register message and send the register acknowledgement message to the source address.

The format of the request message may be similar to that of the register message. The type field of the request message may be different from that of the register message. A value of the type filed in the request message may be six. Other fields of the request message may be similar to those of the LISP register message.

The method examples may be described hereinbefore. The device examples may be described hereinafter.

Figure 7:
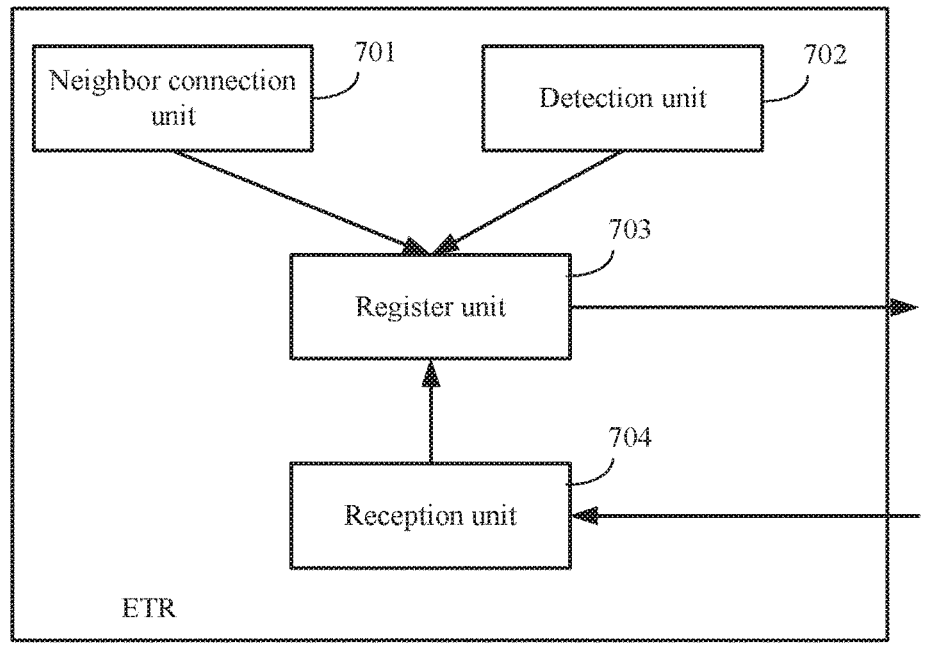
FIG. 7 is a schematic diagram illustrating structure of an Egress Tunnel Router (ETR) for registering an EID in accordance with various examples of the present disclosure.

Referring to FIG. 7, FIG. 7 is a schematic diagram illustrating structure of an Egress Tunnel Router (ETR) for registering an EID in accordance with various examples of the present disclosure. As shown in FIG. 7, the ETR may include following units.

A neighbor connection unit 701 may be configured to establish a neighbor connection with an MS.

A detection unit 702 may be configured to perform accessible detection for the MS.

A register unit 703 may be configured to register all EIDs configured on the ETR with the MS after the neighbor connection unit 701 establishes the neighbor connection with the MS or after the detection unit 702 detects a status update of the MS from inaccessible to accessible.

A reception unit 704 may be configured to stop registering a registered EID, i.e. an EID, which may have been registered with the MS, with the MS after the reception unit 704 receives a register acknowledgement message with regard to the registered EID from the MS.

The reception unit 704 may be further configured to receive the register acknowledgement message with regard to the registered EID from the MS.

The neighbor connection unit 701 may establish the neighbor connection with the MS via following operations:

configuring a connection state between the ETR and the MS as DOWN;

transmitting a first LISP hello message to the MS according to a transmitting interval configured on the ETR;

receiving a second LISP hello message from the MS;

if the connection state between the ETR and the MS is DOWN, checking whether a transmitting interval and keep-alive time in the second LISP hello message is same as the transmitting interval and keep-alive time configured on the ETR, if the transmitting interval and keep-alive time in the second LISP hello message is same as the transmitting interval and keep-alive time configured on the ETR, setting a neighbor field in a third LISP hello message to be an address of the MS and sending the third LISP hello message to the MS when the transmitting interval configured on the ETR times out, starting a keep-alive timer corresponding to the MS, time-out time of which may be the keep-alive time configured on the ETR, changing the connection state between the ETR and the MS to Init and discarding the second LISP hello message if the transmitting interval and keep-alive time in the second LISP hello message is different from the transmitting interval and keep-alive time configured on the ETR;

if the connection state between the ETR and the MS is Init and a neighbor filed in a fourth LISP hello message received from the MS is an address of the ETR, setting a neighbor field in a fifth LISP hello message to be the address of the MS and sending the fifth LISP hello message to the MS when the transmitting interval configured on the ETR times out, updating the keep-alive timer corresponding to the MS and changing the connection state between the ETR and the MS to UP to finish the establishment of the neighbor connection.

After the neighbor connection unit 701 finishes the establishment of the neighbor connection, the neighbor connection unit 701 may be further configured to update the keep-alive timer corresponding to the MS if the neighbor connection unit 701 receives the LISP hello message from the MS before the keep-alive timer corresponding to the MS times out, change the connection state between the ETR and the MS to DOWN when the keep-alive timer corresponding to the MS times out and trigger the operation of re-establishing the neighbor connection with the MS.

The detection unit 702 may perform the accessible detection for the MS via following operations:

preconfiguring the MS as inaccessible;

sending a detection message to the MS according to a preset period;

determining that the MS may be accessible if the reception unit 704 receives a detection response message from the MS in a preset time period after the ETR sends the detection message to the MS, checking whether the MS is configured as accessible or inaccessible, changing the MS from inaccessible to accessible if the MS is configured as inaccessible and maintaining the MS as accessible if the MS is configured as accessible;

determining that the MS may be inaccessible if the reception unit 704 does not receive the detection response message from the MS in the preset time period after the ETR sends the detection message to the MS, checking whether the MS is configured as accessible or inaccessible, maintaining the MS as inaccessible if the MS is configured as inaccessible and changing the MS from accessible to inaccessible if the MS is configured as accessible.

The register unit 703 may register the EIDs configured on the ETR with the MS via following operations:

selecting to-be-registered EIDs from all unregistered EIDs configured on the ETR according to a principle of registering N or less than N EIDs each time;

copying the to-be-registered EIDs to a preset retransmission list, sending a register message carrying the to-be-registered EIDs to the MS, starting a retransmission timer, time-out time of which may be preset;

making a determination as to whether the register acknowledgement message with regard to the to-be-registered EIDs is received from the MS;

if the register acknowledgement message with regard to the to-be-registered EIDs is received from the MS and retransmission timer does not time out, deleting all the to-be-registered EIDs in the retransmission list, returning to perform selecting the to-be-registered EIDs from all the unregistered EIDs configured on the ETR according to the principle of registering N or less than N EIDs each time if there are unregistered EIDs on the ETR;

if the register acknowledgement message with regard to the to-be-registered EIDs is not received from the MS, sending the to-be-registered EIDs, with regard to which the register acknowledgement message is not received, in the retransmission list using a register message to the MS, restarting the retransmission timer and returning to perform making the determination as to whether the register acknowledgement message with regard to the to-be-registered EIDs is received from the MS.

If the neighbor connection between the ETR and the MS is normal or the MS is accessible, the register unit 703 may further execute following operations:

registering a newly added EID with the MS and stopping registering the newly added EID with the MS if the ETR receives a register acknowledgement message with regard to that the newly added EID may have been registered with the MS from the MS;

notifying the MS of to-be-deleted EIDs so that the MS deletes the to-be-deleted EIDs from all registered EIDs and deleting the to-be-deleted EIDs after the ETR receives a deletion acknowledgement message with regard to that the to-be-deleted EIDs may have been deleted by the MS from the MS.

Figure 8:
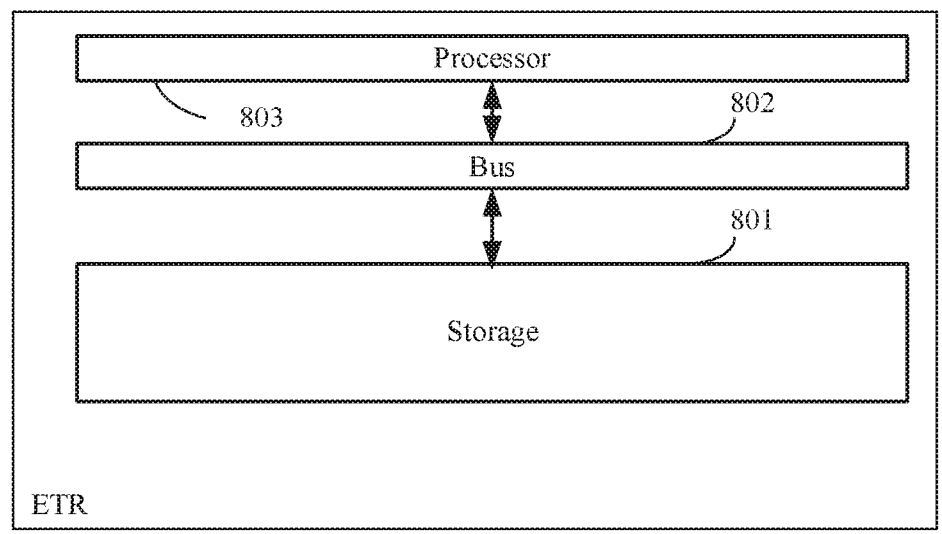
FIG. 8 is a schematic diagram illustrating structure of another ETR for registering the EID in accordance with various examples of the present disclosure.

FIG. 8 is a schematic diagram illustrating structure of another ETR for registering the EID in accordance with various examples of the present disclosure. The ETR may include: a storage 801, a bus 802 and a processor 803.

The storage 801 may be configured to store machine-readable instructions.

The processor 803, such as CPU may be configured to execute the machine-readable instruction in the storage 801 to:

establish a neighbor connection with a MS;

send an accessible detection message to the MS;

after the ETR establishes the neighbor connection with the MS or detects a status update of the MS from inaccessible to accessible, register all EIDs configured on the ETR with the MS; and after the ETR receives a register acknowledgement message with regard to a registered EID from the MS, stop registering the registered EID with the MS.

Figure 9:
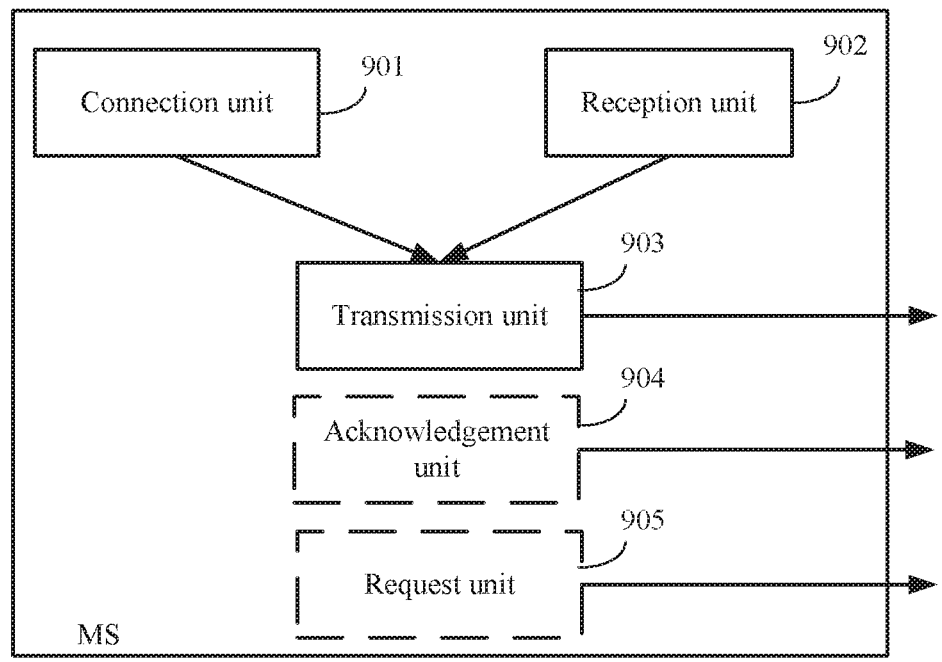
FIG. 9 is a schematic diagram illustrating structure of a Map Server (MS) for registering the HD in accordance with examples of the present disclosure.

FIG. 9 is a schematic diagram illustrating structure of an MS for registering the EID in accordance with examples of the present disclosure. As shown in FIG. 9, the MS may include following units.

A connection unit 901 may be configured to establish a neighbor connection with an ETR or receive an accessible detection message from the ETR.

A reception unit 902 may be configured to receive all EIDs from the ETR. The ETR may register all the EIDs with the MS after the ETR establishes the neighbor connection with the MS, i.e. after the establishment of the neighbor connection between the ETR and the MS is finished or after the MS is changed from inaccessible to accessible.

A transmission unit 903 may be configured to send a register acknowledgement message with regard to registered EIDs to the ETR, so that the ETR may stop registering the registered EIDs with the MS.

An example of the present disclosure may further include an acknowledgement unit 904, configured to make a determination as to whether an address of the ETR is stored in a database on the MS;

store and associate the address of the ETR with the EIDs received from the ETR if the address of the ETR is not stored in the database on the MS;

store the EIDs received from the ETR in the database on the MS and associate the EIDs received from the ETR with the address of the ETR.

The connection unit 901 may establish the neighbor connection with the ETR via following operations:

configuring a connection state between the MS and the ETR as DOWN;

transmitting a first LISP hello message to the ETR according to a transmitting interval configured on the MS;

receiving a second LISP hello message from the ETR;

if the connection state between the ETR and the MS is DOWN, checking whether a transmitting interval and keep-alive time in the second LISP hello message is same as the transmitting interval and keep-alive time configured on the MS, if the transmitting interval and keep-alive time in the second LISP hello message is same as the transmitting interval and keep-alive time configured on the MS, setting a neighbor field in a third LISP hello message to be an address of the ETR and sending the third LISP hello message to the ETR when the transmitting interval configured on the MS times out, starting a keep-alive timer corresponding to the ETR, time-out time of which may be the keep-alive time configured on the MS, changing a connection state between the ETR and the MS to Init and discarding the second LISP hello message if the transmitting interval and keep-alive time in the second LISP hello message is different from the transmitting interval and keep-alive time configured on the MS;

if the connection state between the ETR and the MS is Init and a neighbor filed in a fourth LISP hello message received from the ETR is an address of the MS, setting a neighbor field in a fifth LISP hello message to be the address of the ETR and sending the fifth LISP hello message to the ETR when the transmitting interval configured on the MS times out, updating the keep-alive timer corresponding to the ETR and changing the connection state between the ETR and the MS to UP to finish the establishment of the neighbor connection.

After the establishment of the neighbor connection is finished, the connection unit 901 may be further configured to update the keep-alive timer corresponding to the ETR if the reception unit 902 receives the LISP hello message from the ETR before the keep-alive timer corresponding to the ETR times out, change the connection state between the MS and the ETR to DOWN when the keep-alive timer corresponding to the ETR times out, start an aging timer and delete the address of the ETR and all the EIDs associated with the address of the ETR from the database on the MS when the aging timer times out.

After the acknowledgement unit 904 returns the register acknowledgement message, the acknowledgement unit 904 may be further configured to periodically send a detection message to the ETR;

determine that the ETR may be inaccessible if the MS does not receive a detection response message from the ETR in a preset time period after the MS sends the detection message to the ETR;

start an aging timer;

delete the address of the ETR and all EIDs associated with the address of the ETR from a database on the MS when the aging timer times out.

The reception unit 902 may be further configured to receive a newly added EID from the ETR and a to-be-deleted EID from the ETR.

The acknowledgement unit 904 may be further configured to store the newly added EID in the database on the MS when the reception unit 902 receives the newly added EID from the ETR, associate the newly added EID with the address of the ETR and return a register acknowledgement message to the ETR.

The acknowledgement unit 904 may be further configured to find the to-be-deleted EID from all the EIDs associated with the address of the ETR in the database on the MS when the reception unit 902 receives the to-be-deleted EID from the ETR, delete the to-be-deleted EID and return a deletion acknowledgment message to the ETR.

The MS may further include a request unit 905 configured to, if the MS does not store EIDs configured on the ETR, send a request message to the ETR to request for all of or partial of the EIDs configured on the ETR.

The reception unit 902 may be further configured to receive a register message carrying the EIDs requested by the MS from the ETR.

The acknowledgement unit 904 may be further configured to make a determination as to whether a source address of the register message is stored in the database on the MS, store and associate the source address with the EIDs in the register message and send a register acknowledgement message to the source address if the source address of the register message is not stored in the database on the MS, store the EIDs in the register message and associate the EIDs in the register message with the source address and send the register acknowledgement message to the ETR if the source address of the register message is stored in the database on the MS.

Figure 10:
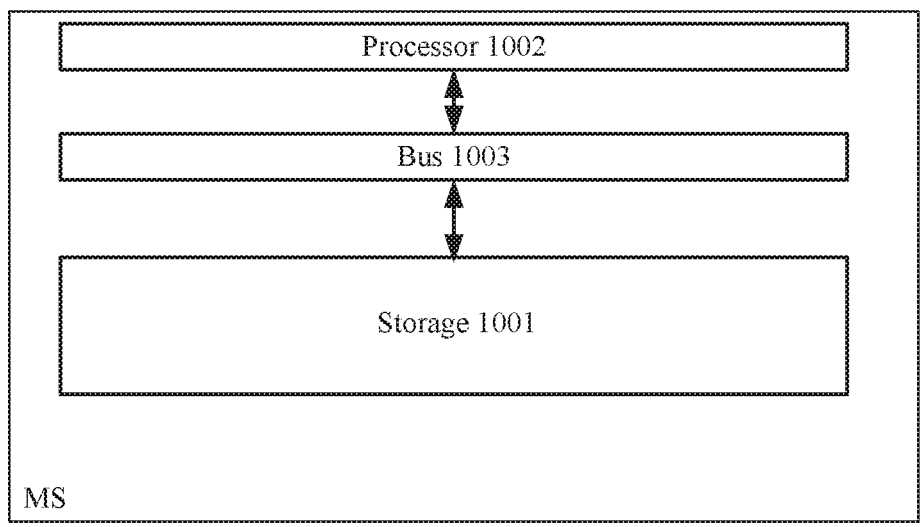
FIG. 10 is a schematic diagram illustrating structure of another MS for registering the EID in accordance with examples of the present disclosure.

FIG. 10 is a schematic diagram illustrating structure of another MS for registering the EID in accordance with examples of the present disclosure. The MS may include: a storage 1001, a processor 1002 and a bus 1003.

The storage 1001 may be configured to store machine-readable instructions.

The processor 1002, such as CPU may be configured to execute the machine-readable instruction in the storage 1001 to:

establish a neighbor connection with an ETR or receive an accessible detection message from the ETR;

receive EIDs from the ETR;

register the EIDs in a database on the MS after the neighbor connection is established between the MS and the ETR or the MS is changed from inaccessible to accessible;

send a register acknowledgement message with regard to registered EIDs to the ETR, so that the ETR stops registering the registered EIDs with the MS.

In an example of the present disclosure, the CPU may be further configured to execute machine-readable instructions in the storage 1001 to respectively execute the operations performed by the acknowledgement unit 904 and request unit 905 in the example corresponding to FIG. 9.

What is claimed is:

1. An Endpoint Identifier (EID) registration method, comprising:
   after an Egress Tunnel Router (ETR) establishes a neighbor connection with a Map Server (MS) or detects a status update of the MS from inaccessible to accessible, registering, by the ETR, all EIDs configured on the ETR with the MS; and
   after the ETR receives a register acknowledgement message with regard to a registered EID from the MS, stopping, by the ETR, registering the registered EID with the MS.

2. The method according to claim 1, further comprising establishing, by the ETR, the neighbor connection with the MS,
   wherein establishing, by the ETR, the neighbor connection with the MS comprises:
   transmitting, by the ETR, a neighbor establishment message to the MS;
   changing, by the ETR, a connection state between the ETR and the MS to Init if the connection state between the ETR and the MS is DOWN and transmitting interval and keep-alive time in a neighbor establishment message received from the MS is same as transmitting interval and keep-alive time locally configured on the ETR;
   changing, by the ETR, the connection state between the ETR and the MS to UP if the connection state between the ETR and the MS is Init and a neighbor filed in a neighbor establishment message received from the MS is an address of the ETR.

3. The method according to claim 1, further comprising:
   sending, by the ETR, a detection message periodically to the MS;
   determining, by the ETR, that the MS is accessible if the ETR receives a detection response message from the MS within a preset time period after the ETR sends the detection message to the MS, checking whether the MS is configured as accessible or inaccessible configuring the MS as accessible if the MS is configured as inaccessible and maintaining the MS as accessible if the MS is configured as accessible;
   determining, by the ETR, that the MS is inaccessible if the ETR does not receive the detection response message from the MS within the preset time period after the ETR sends the detection message to the MS, checking whether the MS is configured as accessible or inaccessible, maintaining the MS as inaccessible if the MS is configured as inaccessible and configuring the MS as inaccessible if the MS is configured as accessible.

4. The method according to claim 1, wherein registering, by the ETR, all the EIDs configured on the ETR with the MS comprises:
   selecting, by the ETR, to-be-registered EIDs from all unregistered EIDs configured on the ETR;
   copying the to-be-registered EIDs to a preset retransmission list, sending a register message carrying the to-be-registered EIDs to the MS;
   making, by the ETR, a determination as to whether the register acknowledgement message is received from the MS;
   if the register acknowledgement message is received from the MS, deleting, by the ETR, all the to-be-registered EIDs in the retransmission list;
   if the register acknowledgement message is not received from the MS, sending, by the ETR, a register message carrying the to-be-registered EIDs, with regard to which the register acknowledgement message is not received, to the MS, and returning to perform making the determination as to whether the register acknowledgement message is received from the MS.

5. The method according to claim 1, if the neighbor connection between the ETR and the MS is normal or the MS is accessible, further comprising:
   registering, by the ETR, a newly added EID with the MS and stopping registering the newly added EID with the MS if the ETR receives a register acknowledgement message with regard to the newly added EID from the MS;
   determining, by the ETR, a to-be-deleted EID and notifying the MS of the to-be-deleted EID so as to cause the MS to delete the to-be-deleted EID from all registered EIDs, and deleting, by the ETR, the to-be-deleted EID after the ETR receives a deletion acknowledgement message indicating that the to-be-deleted EID has been deleted by the MS from the MS.

6. An Endpoint Identifier (EID) registration method, comprising:
   establishing, by a Map Server (MS), a neighbor connection with an Egress Tunnel Router (ETR) or receiving an accessible detection message from the ETR;
   receiving, by the MS, EIDs from the ETR;
   registering, by the MS, the EIDs in a database on the MS after the neighbor connection is established between the MS and the ETR or the MS is changed from inaccessible to accessible;
   sending, by the MS, a register acknowledgement message with regard to registered EIDs to the ETR, so that the ETR stops registering the registered EIDs with the MS.

7. The method according to claim 6, further comprising:
   making, by the MS, a determination as to whether an address of the ETR is stored in the database on the MS;
   storing and associating, by the MS, the address of the ETR with the EIDs received from the ETR if the address of the ETR is not stored in the database on the MS;
   storing, by the MS, the EIDs received from the ETR in the database on the MS and associating the EIDs received from the ETR with the address of the ETR if the address of the ETR is stored in the database on the MS.

8. The method according to claim 7, wherein establishing, by the MS, the neighbor connection with the ETR comprises:

transmitting, by the MS, a neighbor establishment message to the ETR;

changing, by the MS, a connection state between the ETR and the MS to Init if the connection state between the ETR and the MS is DOWN and transmitting interval and keep-alive time in a neighbor establishment message received from the ETR is same as transmitting interval and keep-alive time locally configured on the MS;

changing, by the MS, the connection state between the ETR and the MS to UP if the connection state between the ETR and the MS is Init and a neighbor filed in the neighbor establishment message received from the ETR is an address of the MS.

9. The method according to claim 7, further comprising:
periodically sending, by the MS, a detection message to the ETR;
determining, by the MS, that the ETR is inaccessible if the MS does not receive a detection response message from the ETR in a preset time period after the MS sends the detection message to the ETR;
starting an aging timer;
deleting the address of the ETR and all EIDs associated with the address of the ETR from the database on the MS when the aging timer times out.

10. The method according to claim 7, further comprising:
receiving, by the MS, a newly added EID from the ETR, storing the added EID at the database on the MS, associating the newly added EID with the address of the ETR and returning a register acknowledgement message to the ETR;
receiving, by the MS, a to-be-deleted EID from the ETR, finding the to-be-deleted EID from all the EIDs associated with the address of the ETR from the database on the MS, deleting the to-be-deleted EID and returning a deletion acknowledgment message to the ETR.

11. An Egress Tunnel Router (ETR), comprising: a non-transitory storage and a processor, wherein the processor executes machine readable instructions on the non-transitory storage, to
establish a neighbor connection with a Map Server (MS);
send an accessible detection message to the MS;
after the ETR establishes the neighbor connection with the MS or detects a status update of the MS from inaccessible to accessible, register all End Point Identifiers (EIDs) configured on the ETR with the MS; and
after the ETR receives a register acknowledgement message with regard to a registered EID from the MS, stop registering the registered EID with the MS.

12. The ETR according to claim 11, wherein the processor is further to execute the machine readable instructions on the non-transitory storage to,
transmit a neighbor establishment message to the MS;
change a connection state between the ETR and the MS to Init if the connection state between the ETR and the MS is DOWN and transmitting interval and keep-alive time in a neighbor establishment message received from the MS is same as transmitting interval and keep-alive time locally configured on the ETR;
change the connection state between the ETR and the MS to UP if the connection state between the ETR and the MS is Init and a neighbor filed in the neighbor establishment message received from the MS is an address of the ETR.

13. The ETR according to claim 11, wherein the processor is further to execute the machine readable instructions on the non-transitory storage to,
send a detection message periodically to the MS;
determine that the MS is accessible if the ETR receives a detection response message from the MS in a preset time period after the ETR sends the detection message to the MS, check whether the MS is configured as accessible or inaccessible, configure the MS as accessible if the MS is configured as inaccessible and maintain the MS as accessible if the MS is configured as accessible;
determine that the MS is inaccessible if the ETR does not receive the detection response message from the MS in the preset time period after the ETR sends the detection message to the MS, check whether the MS is configured as accessible or inaccessible, maintain the MS as inaccessible if the MS is configured as inaccessible and configure the MS as inaccessible if the MS is configured as accessible.

14. The ETR according to claim 11, wherein the processor is further to execute the machine readable instructions on the non-transitory storage to,
select to-be-registered EIDs from all unregistered EIDs configured on the ETR;
copy the to-be-registered EIDs to a preset retransmission list, send a register message carrying the to-be-registered EIDs to the MS;
make a determination as to whether the register acknowledgement message is received from the MS;
if the register acknowledgement message is received from the MS, delete all the to-be-registered EIDs in the retransmission list;
if the register acknowledgement message is not received from the MS, send a register message carrying the to-be-registered EIDs, with regard to which the register acknowledgement message is not received, to the MS, and return to perform making the determination as to whether the register acknowledgement message is received from the MS.

15. The ETR according to claim 11, wherein if the neighbor connection between the ETR and the MS is normal or the MS is accessible, the processor is further to execute the machine readable instructions on the non-transitory storage to,
register a newly added EID with the MS and stop registering the newly added EID with the MS if the ETR receives a register acknowledgement message with regard to that the newly added EID has been registered with the MS from the MS;
determine a to-be-deleted EID and notify the MS of the to-be-deleted EID so that the MS deletes the to-be-deleted EID from all registered EIDs and delete the to-be-deleted EID after the ETR receives a deletion acknowledgement message indicating that the to-be-deleted EID has been deleted by the MS from the MS.

* * * * *